Nov. 6, 1951 J. S. VOYMAS 2,574,443
VARIABLE SPEED TORQUE CONVERTER
Filed April 4, 1949 2 SHEETS—SHEET 1

INVENTOR.
James S. Voymas
BY
Ezekiel Wolf
his Attorney

Nov. 6, 1951 J. S. VOYMAS 2,574,443
VARIABLE SPEED TORQUE CONVERTER
Filed April 4, 1949 2 SHEETS—SHEET 2

INVENTOR.
James S. Voymas
BY
Ezekiel Wolf
his Attorney

Patented Nov. 6, 1951

2,574,443

UNITED STATES PATENT OFFICE 2,574,443

VARIABLE-SPEED TORQUE CONVERTER

James S. Voymas, Newton, Mass.

Application April 4, 1949, Serial No. 85,407

4 Claims. (Cl. 74—688)

The present invention relates to a torque multiplier in which the torque output varies with the load which is applied in such a way that the rotational velocity of the input shaft may be operated without increased speed. The present invention may be applied to a rotational driven system needing a high starting torque as for instance an automobile or a rolling mill where the driven shaft is initially at rest or running at a very low speed compared to the drive shaft. By the means of the present invention, the driven speed will vary from a zero starting driven shaft velocity to a shaft velocity as great as the driving speed or greater in fact if over driven units are employed.

The present invention is particularly applicable in a fluid coupling system or any other kind of a coupling system where the degree of coupling automatically changes with the velocities of the driving and driven members. In the present invention, any suitable type of such fluid coupling may be used as for instance the type that has become quite prominent in certain makes of automotive drive.

The present invention will be more fully described in the specification below when taken in connection with the drawings annexed hereto forming a part thereof, in which.

Figures 1, 2:
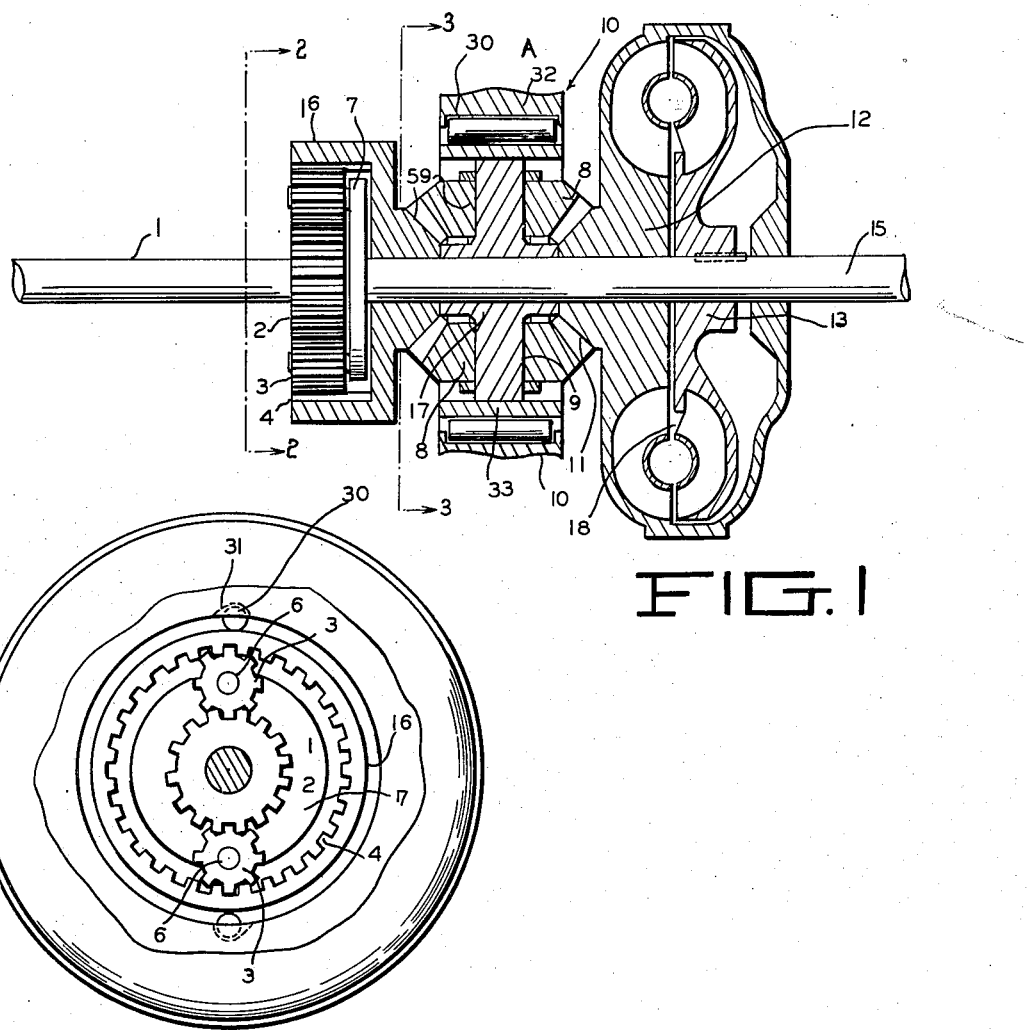
Figure 1 shows a sectional view through the torque multiplier of the present invention.
Figure 2 shows a section taken on the line 2—2 of Figure 1.
Figure 3:
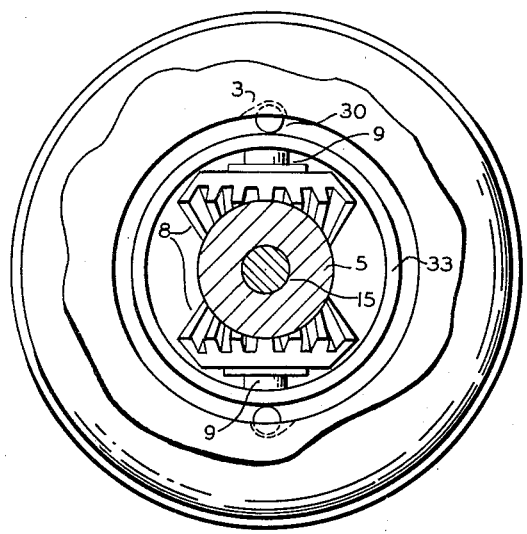
Figure 3 shows a section taken on the line 3—3 of Figure 1.

In Figures 1, 2, and 3 of the drawings, 1 indicates a driving shaft to which is keyed a sun gear 2. A spider or frame 7 supported from the output or driven shaft 15 carries a plurality of planetary gears 3 freely rotatable on a supporting shaft 6 mounted in the frame 7. The idler or planetary gears 3 mesh with an internal ring gear 4 which is mounted for free rotation about the output or driven shaft 15. On the outer side of the casing 16 carrying the ring gear 4 is mounted a bevel type gear 5 which rotates with the ring gear and casing 16 as an integral unit. The bevel gear 5 drives a pair or more of idler pinion gears 8 mounted on shafts 9 which project from a sleeve 17 which is free to rotate on the shaft 15. The assembly of the idler gears 8, the shafts 9 and the sleeve 17 is permitted only to rotate about the shaft 15 in the same direction as the rotation of the shaft 1. This is controlled by means of the over-running one way brake 10 which prevents the shafts 9 from rotating about the shaft 15 in a backwards direction but permits it to rotate in a forward direction. The overrunning one way brake may comprise a cylindrical pin 30 set in a cavity 31 in the ring 32, the cavity having a tapered back section in which the pin will wedge and hold the collar 33 in which the shafts 9 rest. The idler gears 8 drive the bevel gear 11 mounted on the face of the driving fluid coupling member 12, which fluid coupling member is free to rotate about the shaft 15. The flow of the oil across the gap 18 between the fluid coupling member 12 and the coupling member 13 will drive the member 13 at a speed less than or approximately equal to its own speed. When the retarding force on the driven shaft 15 is great, the coupling element 13 which is keyed to the shaft 15 will be driven at a slow speed. Under these conditions the shaft 15 will rotate very slowly or in initial operation may even be stationary.

Under conditions of operation described above, the rotational velocity of the ring gear 4 will be equal to the rotational velocity of the sun gear 2 multiplied by the ratio of the diameter of the sun gear to the diameter of the ring gear 4. This is in fact the lowest velocity obtainable and in consequence the torque will be increased in the ratio of the diameter of the ring gear to that of the sun gear. As the shaft 15 picks up speed the planetary shafts 6 will also increase their speed rotating in the same direction as the shaft 1 until the rotational velocity of the shafts 6 is the same as that of 1 about the common concentric axis. When this condition has been reached, the planetary gears 3 have substantially no rotational velocity and the ring gear 4 has reversed its direction of rotation and now turns at the same speed as the driving shaft 1 in the same direction. This condition is never quite reached as it would mean that the two coupling members 12 and 13 are running at the same speed which of course is only possible when no power is transferred from one to the other.

At some point between the application of full torque under which condition ring gear 4 is rotating backwards with respect to gear 2 and the application of minimum torque at high output speed, the direction of rotation of gear 4 changes from backwards to forwards and at the same time the rotation of the differential gear assembly including gears 8 and shafts 9 changes from a stationary condition or one where the one way brake 10 prevents rotation to one where the assembly rotates forward with the rest of the unit components at one speed. When this differential assembly is stationary, the idlers 8 rotate to transmit power in a reverse direction to the coupling unit 12 so that the coupling unit will be rotating in the same direction as shaft 1.

Figure 4:
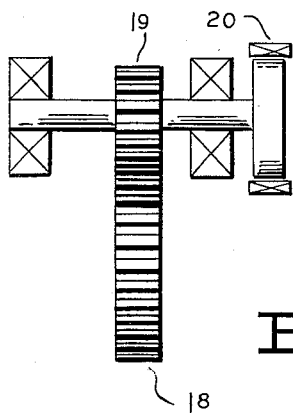
Figure 4 shows a modification of the arrangement of Figure 1.

In order to prevent the reverse rotation of the shaft 15 with respect to the shaft 1 the overrunning one way brake 10 is provided as has been mentioned above. This one way brake in addition to the operation described may be operated manually if desired. As shown in Figure 4, a ring gear 18 may be mounted on the frame carrying the sleeve 17 and this may be geared to a separate gear 19 to which the unidirectional brake 20 may be applied.

The device of the present invention may be used as an automotive drive or it may be used in other capacities where high starting torque is required and where a driving unit would ordinarily use a transmission in which a shift of gear ratios are provided.

Having now described my invention, I claim:

1. A torque multiplier device of the type described comprising a flexible coupling member composed of two separate parts adapted to be rotated at different speeds with one part normally the driving and the other the driven part, a drive shaft having a sun gear thereon, a driven shaft coupled to said driven part carrying a frame and planetary idler gears mounted for rotation thereon engaging said sun gear, a ring gear concentrically mounted with respect to said sun gear and engaging said planetary idler gears, a bevel type planetary gear unit having one set of bevel gears coaxially mounted on the driven shaft with one gear fixed to the ring gear and the other to the driving part of the coupling unit, mounting means coaxially supported freely on the driven shaft having shaft elements perpendicular to the driven shaft, a second set of bevel gears supported for rotation by said shaft elements and brake means for acting against the rotation of said mounting means only in one direction about the driven shaft.

2. A torque multiplier device of the type described comprising a two part flexible fluid coupling member including a drive portion and a driven part having a driven shaft fixed rigidly to the coupling part which is driven, said drive portion of said coupling having bearings freely rotatable on the driven shaft, said drive portion of the coupling member having a housing coaxially mounted on the driven shaft, a bevel gear fixed to the external face of the housing and coaxial with said driven shaft, a second bevel gear mounted coaxially on said driven shaft and facing said first mentioned bevel gear, a pair of bevel pinion gears engaging said first two bevel gears and having a carrier mounted coaxially on the driven shaft with bearing shafts for said bevel pinions perpendicularly positioned with respect to said driven shaft, brake means acting against the rotation of said last mentioned pair of bevel gears about said driven shaft only in one direction, a casing on which said second bevel gear is supported, said casing having a ring gear coaxial with said second bevel gear, a sun gear, a drive shaft for said sun gear, a plurality of planetary gears coupling said sun gear to said ring gear, and means mounting said planetary gears rotatable with said driven shaft.

3. A device as set forth in claim 2 in which an overrunning brake engages the end of perpendicular mounting shafts to prevent rotation of the same in a given direction about the driven shaft.

4. A device as set forth in claim 3, in which said end of the perpendicular mounting shafts are supported in a ring having a ring gear thereon coaxial with said driven shaft, and gear means engaging therewith having a brake element associated with said gear means for controlling the rotation of said ring gears about the driven shaft.

JAMES S. VOYMAS.

REFERENCES CITED

The following references are of record in the file of this patent:

UNITED STATES PATENTS

| Number | Name | Date |
|---|---|---|
| 2,451,401 | Mitchell et al. | Oct. 12, 1948 |

FOREIGN PATENTS

| Number | Country | Date |
|---|---|---|
| 372,983 | Great Britain | May 18, 1932 |
| 450,953 | Great Britain | Apr. 24, 1935 |
| 513,845 | Great Britain | Oct. 24, 1939 |